Oct. 9, 1962 C. SPEROS 3,056,969
FLOWER HOLDER
Filed Oct. 9, 1958
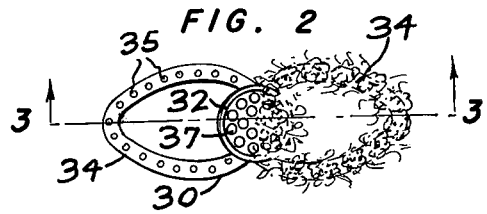
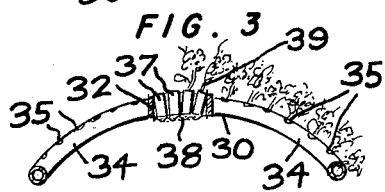
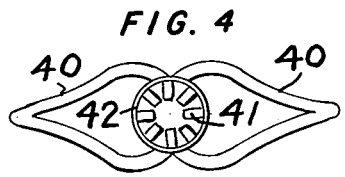
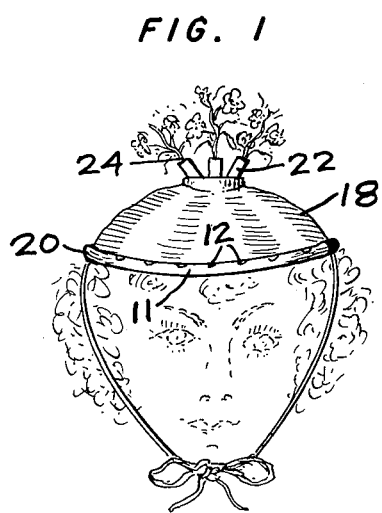
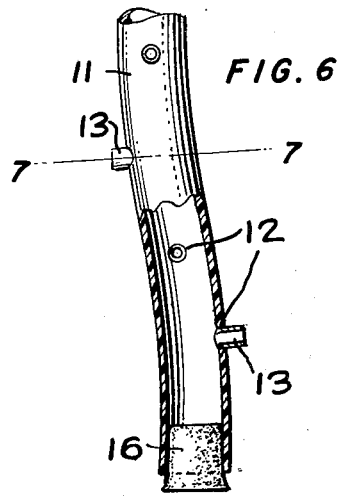
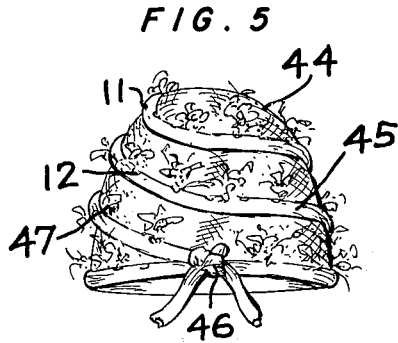
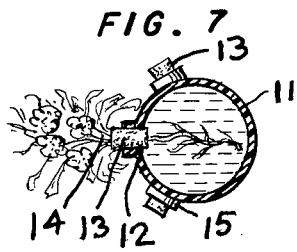
INVENTOR
CARLENE SPEROS

United States Patent Office 3,056,969
Patented Oct. 9, 1962

3,056,969
FLOWER HOLDER
Carlene Speros, Normandy Farm, Falls Road, Rockville, Md.
Filed Oct. 9, 1958, Ser. No. 766,268
1 Claim. (Cl. 2—171)

The present invention relates to flower holders.

An object of the invention is to provide an improved flower holder which is particularly adapted to be incorporated as a part of a woman's headpiece or hat.

Another object of the invention is to provide an improved flower holder which is adapted to be formed of a length of suitable flexible tubular material capable of being arranged in a predetermined form.

A further object of the invention is to provide an improved flower holder of the above type in which the tubular member is formed with a series of flower-stem receiving holes arranged in staggered relationship lengthwise of the member to hold the flowers in irregular positions relative to one another.

Still another object of the invention is to provide an improved flower holder which is simple and inexpensive in construction, fool proof in use and capable of long life.

With the foregoing and other objects and advantages in view, the invention consists in the preferred construction and arrangement of the several parts which will be hereinafter more fully described and claimed.

In the accompanying drawing:

FIGURE 1 is a front elevation of one form of flower holder embodying the present invention;

FIG. 2 is a top plan view of another form of flower holder;

FIG. 3 is a vertical longitudinal section taken along the line 3—3 of FIG. 2;

FIG. 4 is a plan view of a third form of flower holder;

FIG. 5 is a side elevation of a woman's headpiece showing the application of the device of the present invention thereto;

FIG. 6 is an enlarged side elevation partly in section of a portion of the device of the present invention; and FIG. 7 is a transverse section taken along the line 7—7 of FIG. 6.

Referring to FIG. 6 of the drawing, the new and improved flower holder of the present invention is adapted to be constructed of a length of a tubular member 11, preferably formed of suitable flexible material, such as rubber composition, synthetic resin or other plastic compositions, and the like. The purpose of utilizing such a flexible member is to provide means by which flower holders of various configurations can be readily formed.

So that the flowers will be disposed in a series of irregular positions, the wall of the tubular member 11 is provided with holes or openings 12. These holes 12 should be arranged in staggered spaced relationship lengthwise of the tubular member 11.

If so desired, a relatively short length of a pipe 13 may be mounted in each hole 12, said pipe projecting outwardly from the exterior of the tubular member 11 to provide means for receiving and for supporting the stems 14 of flowers, as shown in FIG. 7.

In lieu of the pipes 13, the stems of the flowers may be, when desired, inserted directly into the holes 12.

The pipes 13 are retained in place on the member 11 by means of collars 15, FIG. 7.

The tubular member 11 is adapted to contain water to prevent the flowers from wilting, and in order to provide a chamber therein for water, each end of the tubular member 11 should be closed by means of a plug or stopper 16, FIG. 6.

FIG. 5 shows one form of the new and improved flower holder mounted on a woman's hat 18. In this form of the invention the tubular member is arranged around the rim of the hat 18, and may be constructed in the form of a continuous loop 20. In addition to the loop 20, the top of the hat 18 may have mounted thereon a plurality of relatively short tubular pieces 22 arranged to receive the stems 24 of flowers so that the flowers will be supported in a series of irregular upright positions in the manner shown.

In FIGS. 2, 3, and 4, the invention is shown applied to a woman's headpiece of the type commonly known as a clip hat.

The clip hat 30 of FIGS. 2 and 3 comprises an annular band or ring 32 of suitable diameter having a pair of diametrically disposed wing-shaped members 34 projecting outwardly therefrom. Each member 34 is constructed of a length of the tubular member 11 arranged in the form of an eliptical loop. The inner ends of the tubular member constituting the loops 34 is connected to the exterior of the band 32 to thereby seal the ends of the tubes and at the same time provide means by which the loops 34 will be supported from the band 32.

As shown in FIG. 3, the two loops 34 is bent downwardly so as to provide an arcuate headpiece which is adapted to snugly fit the head of the wearer in well known manner.

Each of the loops 34 is provided with a series of holes 35 similar to the holes 12 of FIG. 6, for receiving the stems of flowers, and the construction and arrangement of the parts is such that when the stems of flowers are mounted in the holes 35 the main body portion of each loop will be entirely concealed from the top, as seen in the right hand portion of FIG. 2.

A plurality of relatively short tubular members 37 are mounted in an upright position within the annular band or ring 32, said members 37 being supported therein by means of a sheet of padded material 38 mounted on the underside of the ring 32 in the manner shown in FIG. 3. The stems of flowers 39 are inserted into the tubes 37 so that the center of the clip hat will be entirely covered with flowers and thereby increase the utility of the device.

FIG. 4 illustrates another form of clip hat, in which the contour or configuration of the loops 40 is slightly different from the shape of the loops 34 in FIG. 2. In this form of the invention the individual tubes 41 are arranged in a radial manner within the ring or band 42. Otherwise, the device of FIG. 4 corresponds substantially to the device shown in FIGS. 2 and 3.

A woman's headpiece or hat of the style known as a tall turban cloche is somewhat conical in form, as shown at 44, FIG. 5.

When it is desired to incorporate the flower holder of the present invention with the hat 44, a length of the tubular member 11 having the holes 12 formed therein in the manner heretofore described, is wound around the exterior of the hat in the form of a conical spiral 45. Thus, in this form of the invention the flower holder will be in the form of a plane curve traced by a point moving around a fixed point from which it continually recedes, so that the flower holder may extend in one piece or section from the lower portion of the hat in the form of a spiral which extends to the crown of said hat.

In this form of the invention the two ends of the tubular member should be closed by plugs or stoppers, as has been heretofore described.

A suitable securing element may also be employed in the manner indicated at 46, so that the strands of the tubular member 11 will be tied together at a suitable point adjacent to the lower edge of the hat.

It will thus be noted that the flower holder will be in the nature of a loop of predetermined spiral form. Due to the staggered arrangement of the holes 12 lengthwise of the tubular member 11, when the stems of flowers 47 are inserted in said holes, the flowers covering the hat 44 will be disposed in a series of irregular positions over the exterior of the hat.

While the invention has been shown and illustrated in its preferred embodiment, and has included certain details, it should be understood that the invention is not to be limited to the precise details herein illustrated and described since the same may be carried out in other ways falling within the scope of the invention as claimed.

I claim:

A flower holder hat comprising an annular ring member and wing shaped, arcuately formed side members adapted to conform to the shape of the wearer's head, said wing members comprising closed elliptical loops, the ends of which are attached to said annular ring member, a piece of sheet fabric attached to the underneath of said annular ring member and forming a bottom for same, a plurality of short, adjacent, individual liquid containing tubes mounted within said annular ring member and supported by said sheet fabric, said wing shaped side members each comprising a hollow tube having spaced apertures formed therein, each of said tubes and apertures adapted to hold a flower and thereby render said annular ring and said side members invisible when said apertures are filled with flowers.

References Cited in the file of this patent

UNITED STATES PATENTS

| 930,304 | Mate | Aug. 3, 1909 |
| 1,357,732 | Schimmel | Nov. 2, 1920 |

FOREIGN PATENTS

| 47,680 | Denmark | Aug. 14, 1933 |